United States Patent [19]

De Mets

[11] 4,004,873

[45] Jan. 25, 1977

[54] CONTINUOUSLY OPERATING PRESS

[75] Inventor: Albert De Mets, Roeselare, Belgium

[73] Assignee: Konstruktiewerkhuizen DeMets N.V., Belgium

[22] Filed: Aug. 27, 1975

[21] Appl. No.: 608,344

[30] Foreign Application Priority Data

Aug. 27, 1974 Belgium .............................. 147937

[52] U.S. Cl. ............................... 425/335; 425/224; 425/371; 100/153

[51] Int. Cl.² .......................................... B29C 15/00

[58] Field of Search .......... 425/223, 224, 371, 335; 100/151, 153

[56] References Cited

UNITED STATES PATENTS

| | | | |
|---|---|---|---|
| 2,365,804 | 12/1944 | Clerke | 425/371 X |
| 2,631,549 | 3/1953 | Rhodes | 425/371 |
| 3,723,230 | 3/1973 | Troutner | 100/151 X |
| 3,883,285 | 5/1975 | De Mets | 425/224 X |
| 3,887,318 | 6/1975 | De Mets | 425/371 |

*Primary Examiner*—Robert L. Spicer, Jr.
*Attorney, Agent, or Firm*—Craig & Antonelli

[57] ABSTRACT

A continuously operating double belt press in which the belts are formed from a plurality of articulated plates and which further includes endless steel bands surrounding and moving with the endless plate belts is provided with a large-diameter drum downstream of each endless plate belt. In addition, the endless steel band surrounding and moving with each endless plate belt is made to surround and move with the large-diameter drum as well. With this design, the compressive pressure exerted by the endless plate belts can be reduced since the large-diameter drums can be utilized to exert additional pressure at higher pressure levels when the material being processed passes out from between the endless plate belts.

26 Claims, 3 Drawing Figures

CONTINUOUSLY OPERATING PRESS

BACKGROUND OF THE INVENTION

The present invention relates to a continuously operating press for the production of boards, such as chip boards, fiber boards and the like comprising two endless plate belts arranged one above the other and consisting of plates pivoted (articulated) to one another and rotating about parallel horizontal axes. The runs of the endless plate belts facing each other are driveable in the same direction by press-on drums or rollers and each endless plate belt is surrounded by an endless steel band. Presses of this kind have proven superior compared with presses in which the endless plate belts are driven by polygonal drums with plates being provided in place of press-on drums, while thereby the starting energy of the endless plates are considerably reduced. Such presses are primarily used as preliminary presses in which at least the endless plate belts may be heated preferably by gas burners. Also, the endless steel bands surrounding the endless plate bands may be heated.

If, for example, a chip cake or fleece is first passed through a preliminary press in order to be subsequently compressed into a chip board in a finishing press, then a pressure of 15 to 20 kg/cm$^2$ under normal conditions, is exerted on the chip cake as it passes through the preliminary press in order to complete the chip cake such that it will not be damaged during further transport to the finishing press. In such a situation, it is of no consequence whether the finishing press is constructed as a discontinuously or as a continuously operating press. When, however, relatively high pressures must be exerted on the chip cake, problems which cannot be understood arise. These problems are due to the fact that the particles or chips to be compressed into a board, after they have been deposited and spread over a base, preferably onto an endless transport band, do not hang together. Aside from the danger that a portion of the particles or chips or the like small at the upper side of the chip cake may be blown away during entry of the cake into the continuously operating press, (which problem has, in the meantime, now been overcome) the press, on account of exerting pressure, must be constructed very strong. Thus, the press must be relatively heavy and hence also relatively expensive, since the thicker the plates to be produced, the more expensive the press. In addition, when the width of the chip cake exceeds a certain value, the stress limit of the high-grade steel from which the endless plate belts are made, may be exceeded when the pressure is increased to the extent necessary to compress the chip cake and prevent individual chips of the chip cake from debonding from the cake when the cake, after leaving the preliminary press, is moved into a finishing press. It has been shown that the pressure exerted by the endless plate belts can only be increased to a certain value, for example, 20 kg/cm$^2$.

SUMMARY OF THE INVENTION

Thus, the present invention contemplates the development of known, continuously operating presses, especially preliminary presses, so that they in spite of having to exert certain pressures onto a chip cake to be compressed, may be built considerably lighter than was possible prior to the present invention and further so that they may exert higher pressures than were possible with endless plate belts prior to the present invention.

To achieve this in accordance with the present invention a continuously operating press of the type referred to above is provided with at least one large-diameter drum in each of the spaces surrounded by the endless steel bands of the press, the large-diameter drums being located behind the endless plate belts with respect to the motion direction of the endless plate belts as they move over the material pressing portion of their travel paths. The diameters of the largediameter drums are larger than the diameters of each press-on drum, and the large-diameter drums are arranged so that two large-diameter drums are in the same vertical plane. At least one of the large-diameter drums is moveable towards the other with adjustable pressure force. Inasmuch as the linear pressure to be exerted onto the chip cake by the large-diameter drum pair may be considerably larger than the surface pressure exerted by driveable press-on drums over endless plate belts, the maximum required pressure of a preliminary press, for example, 20 kg/cm$^2$, may be brought about by this large-diameter drum pair without requiring an expensive construction for the support of this drum pair. The surface pressure exerted onto the chip cake by the endless plate belts may now be decreased, for example, to 10 kg/cm$^2$ so that the structure of the frame accommodating the endles plate belts may also be considerably simplified. By this means, not only is the total weight of such a press reduced, but also the production cost and maintenance costs thereof can be decreased. The provision of this large-diameter drum pair is especially favorable because each large-diameter drum, because of its large diameter, is so still that deflections which occur with press-on drums acting on endless plate belts are not encountered.

In accordance with the present invention, at least one of the large-diameter drums of each drum pair is driven. Preferably both drums of each drum pair are driven. Preferably, the largediameter drums are driven by the press-on drums which are already driven and which rotate the endless plate belts.

Inasmuch as a certain amount of space is required for reversing the travel direction of the endless plate belts, and because the compression pressure exerted by the endless plate belt may not be sufficient to ensure that expansion of the precompressed chip cake will be prevented, sliding members can be provided between the outlet of the endless plate belts and the large-diameter drum pair. Moreover, at least the sliding member arranged between the upper endless plate belt and the following drum should be adjustable in a vertical direction, by means, for example, of a piston of a hydraulic cylinder or the like. By this means, each endless steel band which surrounds an endless plate belt and at least one large-diameter drum can be held in place until the chip cake reaches a position at which it is no longer influenced by surface pressure. Thus, a chip cake can be made to retain its thickness received by the first compression step before the chip cake is additionally compressed by the following large-diameter drum pair by a linear press pressure.

BRIEF DESCRIPTION OF THE DRAWINGS

The present invention is schematically illustrated in the following drawings in which.

DETAILED DESCRIPTION

Figure 1:
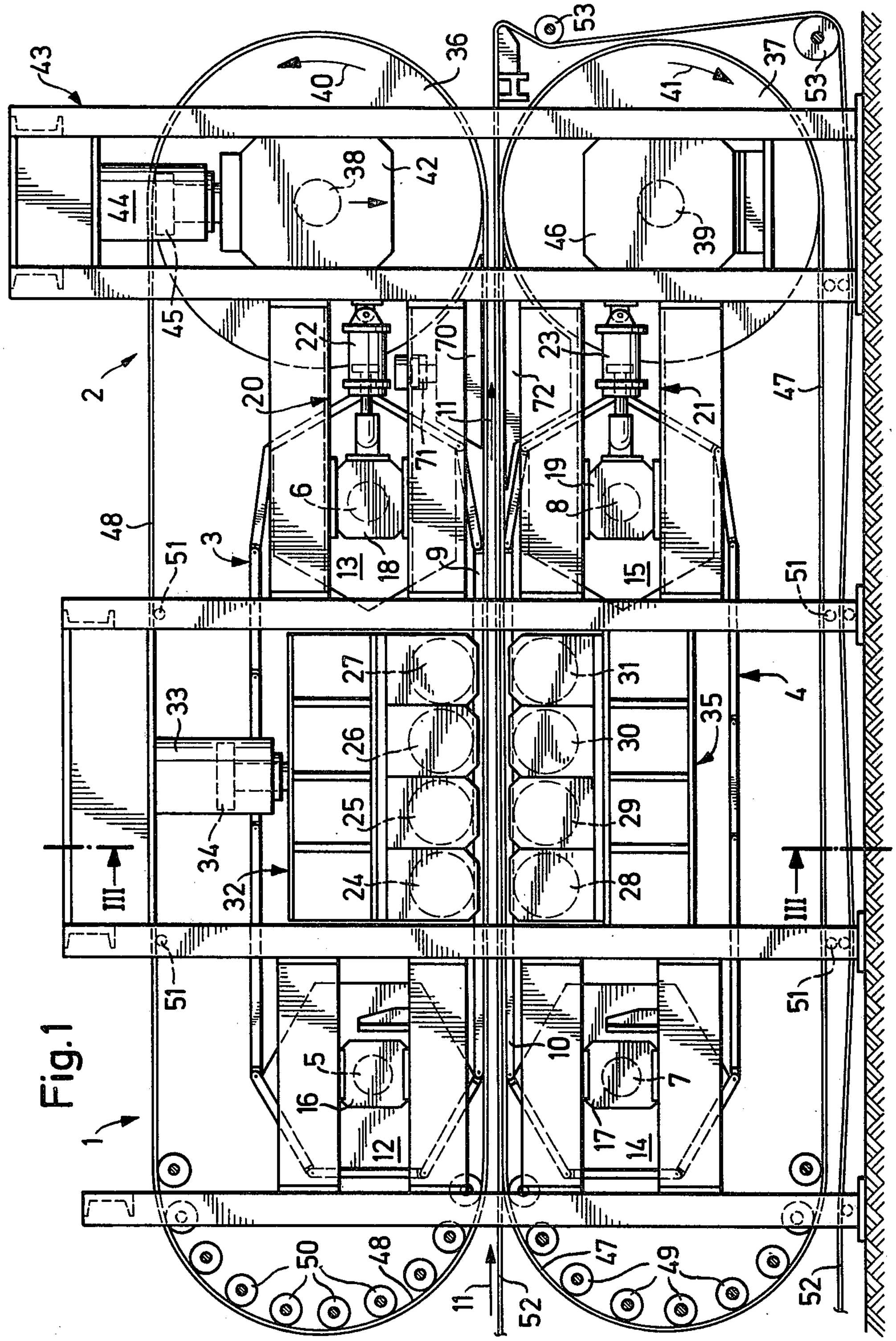
FIG. 1 shows a schematic side view of a continuously operating press constructed in accordance with the present invention.

The embodiment of the inventive press shown in the drawing is provided with a low-pressure zone 1 in which chips or the like are first compressed under a pressure of 10 kg/cm² and a high-pressure zone 2 in which, according to the chip or particle boards to be produced, a pressure of at least about 15 to 20 kg/cm² is exerted, for example, when the exemplified embodiment is used as a preliminary press.

Low-pressure zone 1 is provided with two endless plates belts 3 and 4 arranged one above the other. Each plate belt is formed from flat belt plates pivoted (i.e. articulated) to one another. The plate belts are mounted about parallel, horizontal axles 5, 6 and 7, 8, respectively, for reversing the motion direction thereof.

The runs 9 and 10 facing each other of endless plate belts 3 and 4 move in the direction of arrows 11. Endless plate belts 3 and 4 travel over polygonal reversing drums 12, 13 and 14, 15, respectively, which in turn rotate about axes 5, 6 and 7, 8, respectively.

The shafts rotating about axes 5 and 7 are rotatable in machine-solid bearings 16 and 17, whereas the shafts rotating about axes 6 and 8 are arranged in bearings 18 and 19 which are adjustably mounted on profiles 20 and 21. Bearings 18 and 19 each operatively cooperate with a cylinder-piston-mechanism 22, 23, respectively, which make it possible to tension endless plate belts 3 and 4. Further, pressure rolls 24 to 27 are provided for acting on run 9 of upper endless plate belt 3, and pressure rolls 28 to 31 are provided for acting on run 10 of the lower endless plate belt. The axes of these pressure rolls extend parallel to axes 5 to 8, and at least some of these pressure rolls are driven in a known manner. Pressure rolls 24 to 27 are arranged in a frame which is moveable in a vertical direction by means of a piston 34 sliding in a cylinder 33 in order to transmit a pressure onto the pressure rolls 24 to 27 and hence onto the run 9 of endless plate belt 3, this pressure being controllable.

In the same manner, pressure rolls 28 to 31 acting on run 10 can also be controlled. However, in the case of the illustrated embodiment, these pressure rolls are mounted in a machine-solid frame.

Even though FIG. 1 shows that all of the upper and lower pressure rolls are acted on by respective common pistoncylinder units, in the illustrated embodiment, each pressure roll can be acted by an individual piston-cylinder unit in a known manner. This yields the advantage that the pressures (i.e. compressive forces) exerted on the particle cake or fleece can be progressively increased.

High-pressure zone 2 of the press consists essentially of two drums 36 and 37 having relatively large diameters which rotate about axes 38 and 39, respectively, in the direction of arrows 40 and 41, respectively and are mounted in suitable mounting means. In particular, the shaft corresponding to axis 38 is supported in bearing blocks 42 which are movable in a frame 43 by means of a piston 45 sliding in a cylinder 44 in a vertical direction. By this means, the pressure (i.e. compressive force) acting between drums 36 and 37 may be adjusted and hence regulated.

The shaft corresponding to the axis of rotation 39 is supported in machine-solid bearings 46 while also the frame 35 for the support of the press-on rollers 28 to 31 is arranged machine-solid.

Lower endless plate belt 4 and lower drum 37 are surrounded by a flexible endless steel band 47. In the same manner, upper endless plate belt 3 and upper drum 36 are surrounded by an analogous endless steel band 48. These endless steel bands 47 and 48 move together with the endless plate belts and drums which they surround, that is, with the same speed and in the same direction.

Between endless plate belt 3 and drum 36, a sliding member 70 is provided which is moveable in a vertical direction by a cylinder-piston mechanism 71 and may be pressed onto the steel band 48 in order to hold the steel band always in contact with the already compressed particle cake or fleece. In the same manner, an identical sliding member 72 is provided between endless plate belt 4 and drum 37. Sliding member 72 is solidly connected to the frame of the press. It does not have to be moved in a vertical direction.

Endless steel bank 47 lies on run 10 of endless plate belt 4 and on sliding member 72, travels then over the circumference of drum 37 downwardly, is suspended over rollers 5 and is then fed to reversing means which in the illustrated embodiment consist of a number of rollers 49 until it again rests on run 10.

Endless steel band 48 moves in practically the same way over run 9 of endless plate belt 3, then over sliding member 70, and upper drum 36 of the drum pair 36, 37. Endless steel band 48 is then, supported by rollers 51 and then, fed to a reversing means which consists of rollers 50.

The particle cake or fleece to be compressed is moved into the press by means of an endless transport band 52, the length of which is considerably larger than those of endless steel bands 47 and 48. Endless transport band 52 is moved by means of a control device, and the particle cake or fleece is formed by depositing the cake-forming particles onto the transport band. Transport band 52 is guided outside the press by means of reversing rollers or the like 53.

Figure 2:
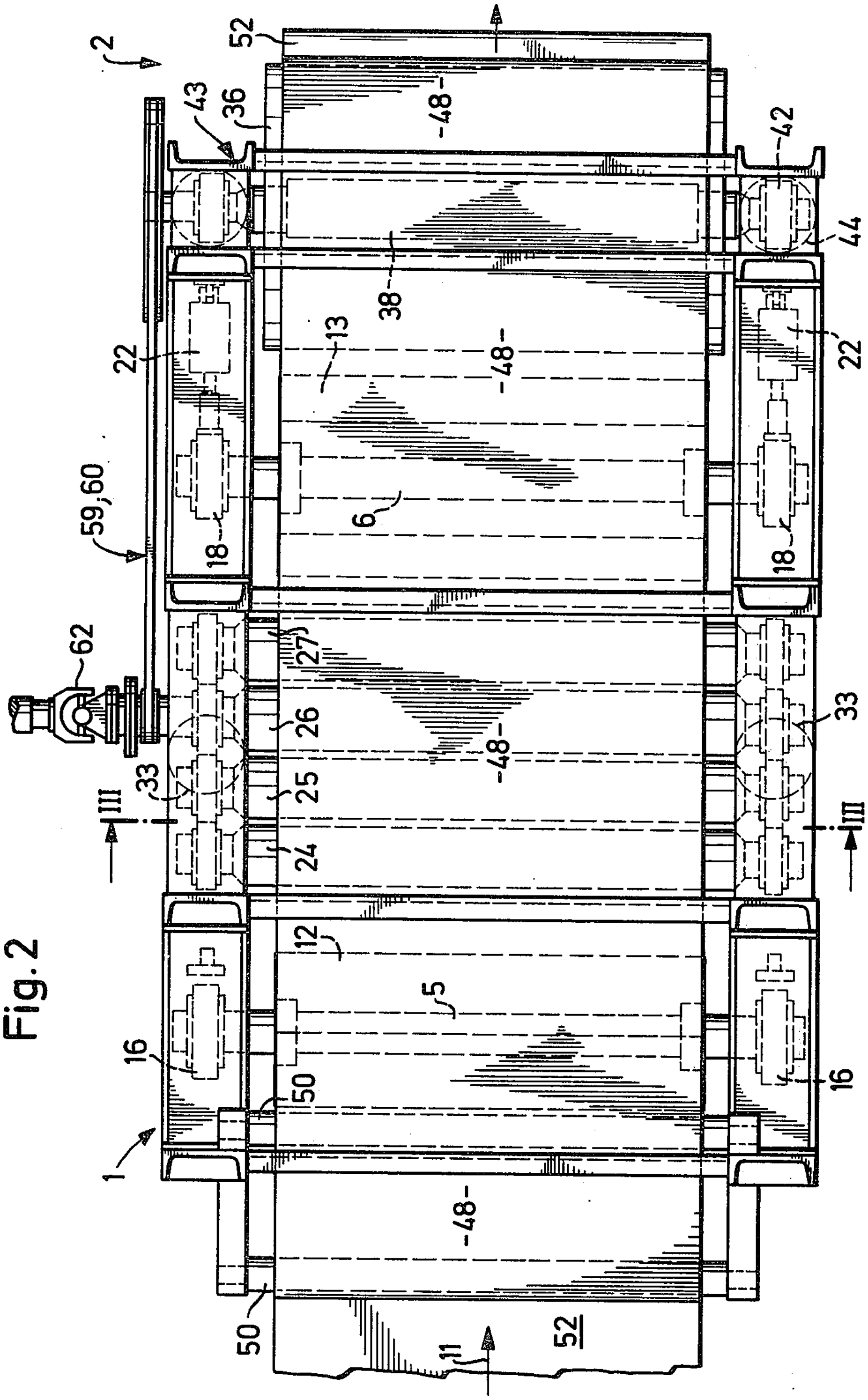
FIG. 2 shows a section along line II—II of FIG. 1.
Figure 3:
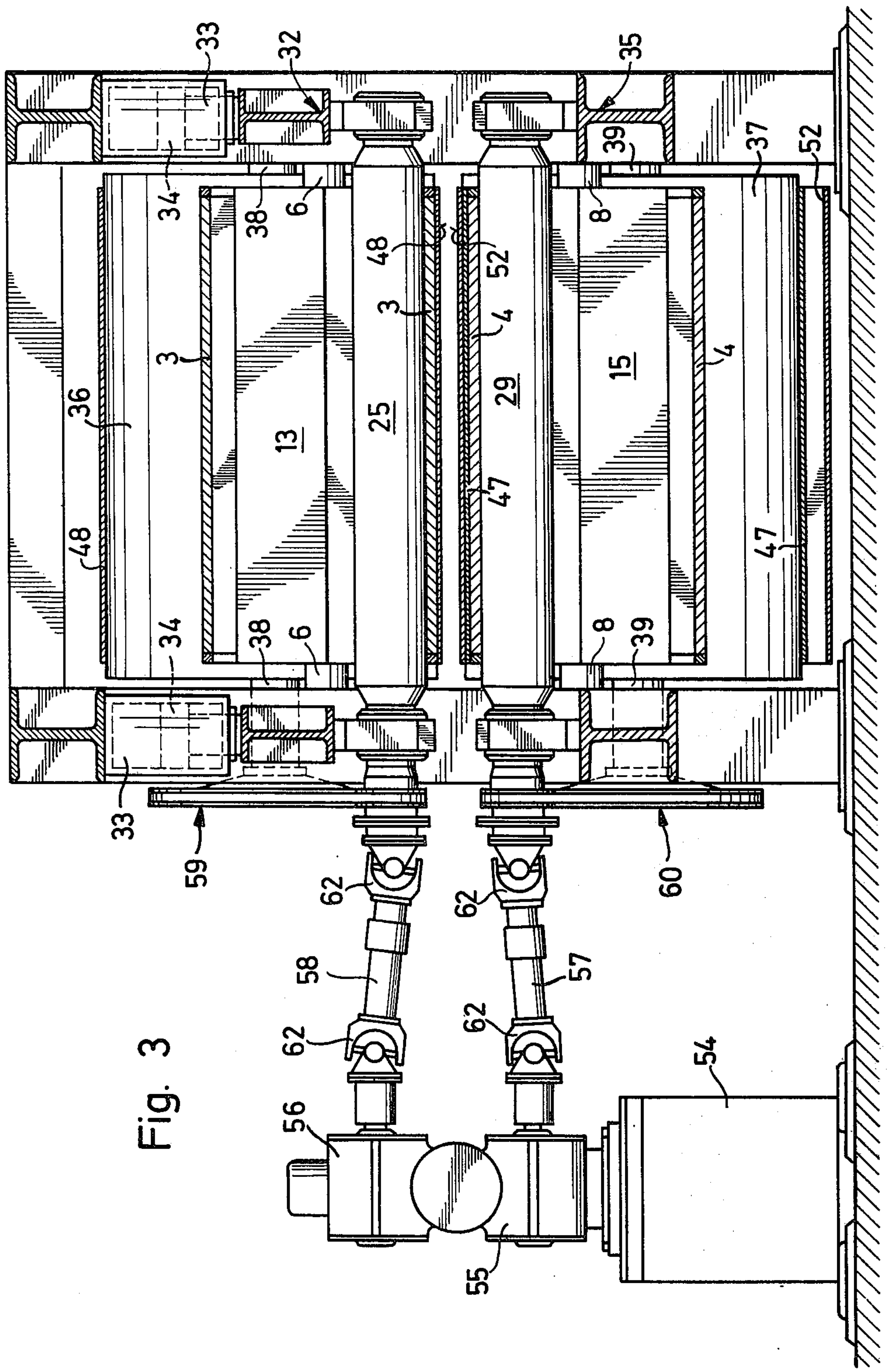
FIG. 3 shows a section along line III—III of FIG. 2.

Pressure rolls 25 and 29 are, as is shown in FIG. 3, driven by a motor 54 through gears 55 and 56, through transmission shafts 57 and 58 which are mounted by means of Cardan shafts between the gear housings and pressure rolls 25 and 29 in alignment therewith. By means of these pressure rolls and also the two drums 36 and 37 of the high-pressure zone are driven through belt or chain drives 59 and 60. Also see FIG. 2.

Since the inventive press is lighter than known presses, it works faster, i.e. its output speed is increased, and moreover it is also less expensive than presses available up to now of considerably heavier construction.

As appreciated by those skilled in the art, the inventive press can be equipped with conventional attachments and equipment used on conventional presses of similar construction. For example, the inventive press can be provided with means for preventing lateral movement of the endless plate belts and the endless steel bands. Heating sources for the heating of individual belts and bands may also be provided. Naturally, also, a number of large-diameter drum pairs may be arranged immediately one behind the other in place of single drum pair 36, 37, in which case sliding members corresponding to sliding members 70 and 72 discussed above should be arranged between respective pairs of drums. It should also be appreciated that all of the pressure rolls can be driven.

Although the foregoing description of the inventive press has been made in connection with the production of fiber board, chip boards and the like, it should be appreciated that the inventive press can also be used for the production of other types of boards, for example, for the production of plywood boards or other multilayer boards.

Moreover, even though the present invention can be used to significant advantage in the production of preliminary presses, it can also be used for the production of finishing presses.

It is also possible in accordance with the present invention to provide two endless plate belts, arranged one above the other, behind the large-diameter drum pairs of the preliminary press. These two endless plate belts can then be surrounded by the endless steel bands of the preliminary press, so that these two endless steel bands surround the endless plate belts of the preliminary press, the largediameter drum pairs of the preliminary press and the endless plate belts of a finishing press.

The foregoing description has been presented for illustrative purposes only and is not intended to limit the invention in any way. All reasonable modifications not specifically disclosed are intended to be included within the scope of the present invention which is to be limited only by the following claims.

What is claimed is:

1. In a continuously operating press for the production of particle boards such as chip boards, fiber boards and the like from particle fleeces, comprising two endless plate belts arranged one above the other and consisting of belt plates pivoted to one another, said plate belts rotating about horizontal and parallel axes, the runs of the plate belts facing each other being driveable in the same direction by pressure rolls, and an endless steel band surrounding each endless plate belt, the improvement comprising at least one large-diameter drum arranged in each space surrounded by the respective endless steel bands, the large-diameter drums being positioned behind the respective endless plate belts with respect to the motion direction of the facing runs of said plate belts, the diameters of the largediameter drums being larger than the diameters of each of said pressure rolls, at least two large-diameter drums being supported in the same vertical plane, at least one of the large-diameter drums supported in the same vertical plane being moveable towards the other large-diameter drum supported in the same vertical plane so that the large-diameter drums in the same vertical plane can exert an adjustable compressive force on the particle fleece passing therebetween.

2. The press of claim 1, further comprising driving means for driving at least one of said large-diameter drums.

3. The press of claim 2, wherein said large-diameter drums are driven by said pressure rolls.

4. The press of claim 3, further comprising a first sliding member arranged between the upper endless plate belt and the respective large-diameter drum, and a second sliding member arranged between the lower endless plate belt and the respective large-diameter drum, at least said first sliding member being moveable in a vertical direction.

5. The press of claim 4, wherein said first and second sliding members are arranged in the same vertical plane so that said sliding members exert a pressure force on the chip cake passing therebetween.

6. The press of claim 2, further comprising a first sliding member arranged between the upper endless plate belt and the respective large-diameter drum, and a second sliding member arranged between the lower endless plate belt and the respective large-diameter drum, at least said first sliding member being moveable in a vertical direction.

7. The press of claim 6, wherein said first and second sliding members are arranged in the same vertical plane so that said sliding members exert a pressure force on the chip cake passing therebetween.

8. The press of claim 1, further comprising a first sliding member arranged between the upper endless plate belt and the respective large-diameter drum, and a second sliding member arranged between the lower endless plate belt and the respective large-diameter drum, at least said first sliding member being moveable in a vertical direction.

9. The press of claim 8, wherein said first and second sliding members are arranged in the same vertical plane so that said sliding members exert a pressure force on the chip cake passing therebetween.

10. In a double belt press including two endless plate belts arranged one above the other so that the facing runs of the plate belts define a material-processing treatment path, said plate belts rotating about polygonal drums arranged on horizontal and parallel axes, said plate belts being formed from a plurality of articulated belt plates, said plate belts being driven by pressure rolls engaging the respective runs of said plate belts, said press further comprising endless bands surrounding each endless plate belt, each endless band being moveable with the respective endless plate belt and defining an interior space, the improvement comprising at least one largediameter drum arranged in the respective interior spaces of each endless band, each large-diameter drum being positioned downstream of the respective endless plate belt with respect to the motion direction of the facing runs of said plate belts and mounting means mounting said large-diameter drums for moving said large-diameter drums together and apart.

11. The press of claim 10, wherein the diameters of said large-diameter drums are larger than the diameters of said pressure rolls.

12. The press of claim 11, wherein said large diameter drums are arranged in pairs, one large-diameter drum of each pair being in the interior space of the upper endless band and the other large-diameter drum being in the interior space of the lower endless band, the two large-diameter drums in at least one pair being arranged in the same vertical plane.

13. The press of claim 12, wherein at least one of the large-diameter drums in at least one pair of vertically arranged large-diameter drums is vertically moveable, said press further comprising means for controlling the vertical movement of said at least one large-diameter drum so that the pressure exerted by said at least one pair of large-diameter drums on the chip cake passing therebetween can be controlled.

14. The press of claim 13, wherein said endless bands after passing out of said material-processing treatment path reverse their directions by rotating around said large-diameter drums.

15. The press of claim 14, further comprising drive means for driving said large-diameter drums.

16. The press of claim 15, wherein said large-diameter drums are driven by means of the pressure rolls driving said endless plate belts.

17. The press of claim 11, wherein said endless bands after passing out of said material-processing treatment path reverse their directions by rotating around said large-diameter drums.

18. The press of claim 17, further comprising drive means for driving said large-diameter drums.

19. The press of claim 18, wherein said large-diameter drums are driven by means of the pressure rolls driving said endless plate belts.

20. The press of claim 10, wherein said endless bands after passing out of said material-processing treatment path reverse their directions by rotating around said large-diameter drums.

21. The press of claim 20, further comprising drive means for driving said large-diameter drums.

22. The press of claim 21, wherein said large-diameter drums are driven by means of the press-on rollers driving said endless plate belts.

23. The press of claim 10, wherein said largediameter drums are arranged in pairs, one large-diameter drum of each pair being in the interior space of the upper endless band and the other large-diameter drum being in the interior space of the lower endless band, the two large-diameter drums in at least one pair being arranged in the same vertical plane.

24. The press of claim 23, wherein at least one of the large-diameter drums in at least one pair of vertically arranged large-diameter drums is vertically moveable, said press further comprising means for controlling the vertical movement of said at least one large-diameter drum so that the pressure exerted by said at least one pair of large-diameter drums of the chip cake passing therebetween can be controlled.

25. The press of claim 10, wherein said endless plate belts rotate about polygonal drums.

26. In a double belt press including two endless plate belts formed from a plurality of articulated belt plates and rotating about polygonal drums, said press further comprising an endless band surrounding and moving with each plate belt, the improvement comprising at least one large-diameter drum positioned downstream of each plate belt within the interior space defined by each endless band, the large-diameter drums being arranged in pairs, one large-diameter drum of each pair being positioned within the interior space of one endless band and the other large-diameter drum of each pair being positioned in the interior space of the other endless band, said large-diameter drums being arranged to exert a pressure on the material passing therebetween.

* * * * *

UNITED STATES PATENT OFFICE
CERTIFICATE OF CORRECTION

Patent No. 4,004,873 Dated January 25, 1977

Inventor(s) Albert De Mets

It is certified that error appears in the above-identified patent and that said Letters Patent are hereby corrected as shown below:

Column 1, line 40, delete "small"

Column 4, line 22, delete "5" and insert --51--.

Signed and Sealed this

*Third* Day of *October 1978*

[SEAL]

*Attest:*

RUTH C. MASON
*Attesting Officer*

DONALD W. BANNER
*Commissioner of Patents and Trademarks*